(No Model.) 2 Sheets—Sheet 1.

J. J. JOHNSTON.
FARM STOVE.

No. 264,410. Patented Sept. 12, 1882.

WITNESSES
Fred. G. Dieterich.
P. C. Dieterich.

INVENTOR
James J. Johnston

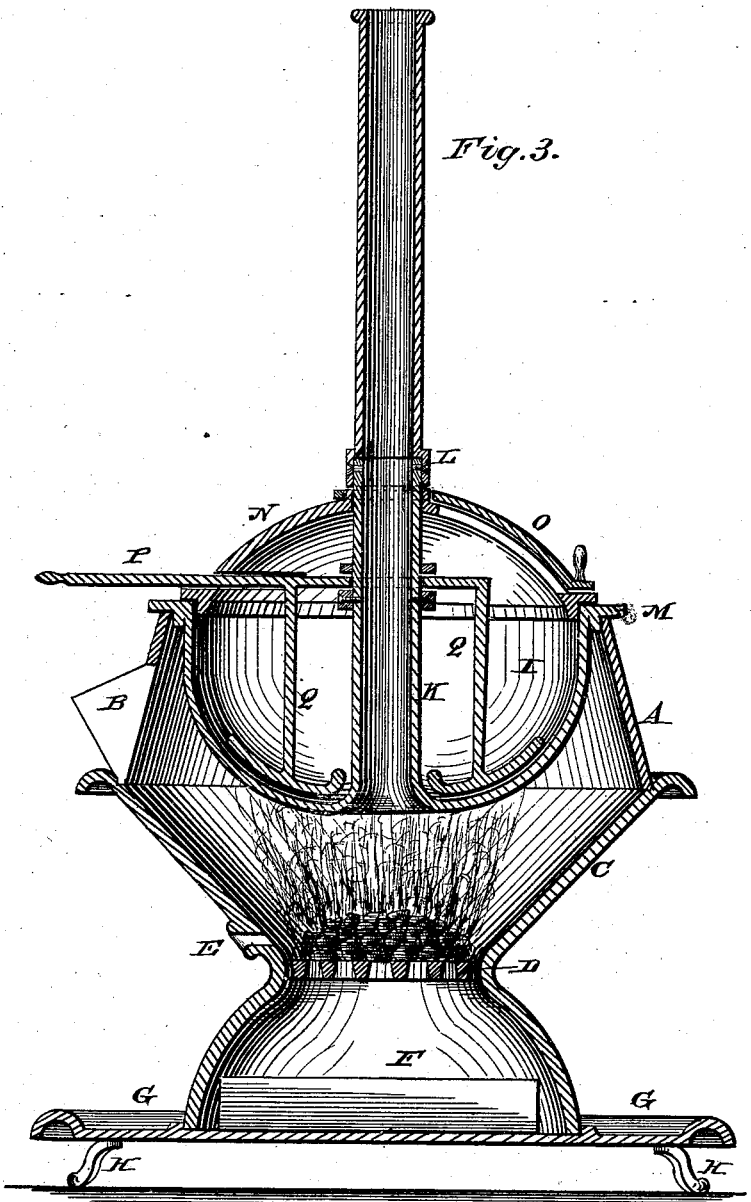

United States Patent Office.

JAMES J. JOHNSTON, OF COLUMBIANA, OHIO.

FARM-STOVE.

SPECIFICATION forming part of Letters Patent No. 264,410, dated September 12, 1882.

Application filed February 11, 1882. (No model.)

*To all whom it may concern:*

Be it known that I, JAMES J. JOHNSTON, of Columbiana, in the county of Columbiana and State of Ohio, have invented a certain new and useful Improvement in Farm-Stoves; and I do hereby declare that the following is a full, clear, and exact description thereof, reference being had to the accompanying drawings, and to the letters of reference marked thereon.

My invention relates to an improvement in farm-stoves; and it consists of a stove having a boiler or kettle with a flue projecting vertically through it and furnished with a lid constructed in two parts and pivoted around said flue, and a stirring apparatus also pivoted to said flue, the whole constructed and operating as will hereinafter more fully and at large appear.

To enable others skilled in the art with which my invention is most nearly connected to make and use it, I will proceed to describe its construction and operation.

Figure 1:
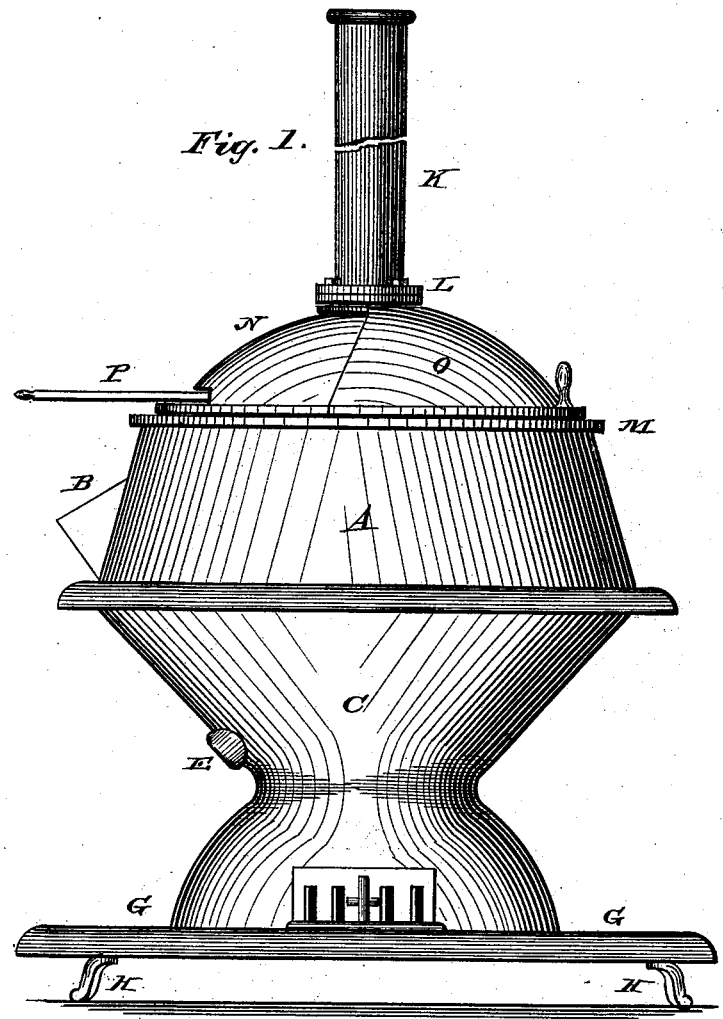
Figure 2:
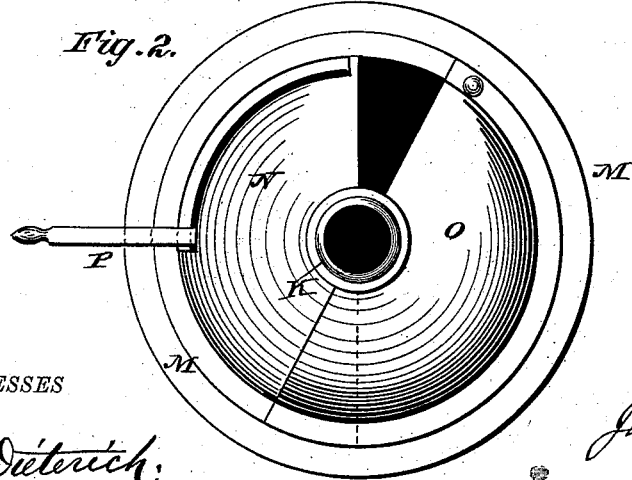

In the accompanying drawings, which form part of my specification, Figure 1 is a side elevation of my improvement in farm-stoves. Fig. 2 is a top view of the same. Fig. 3 is a vertical section of the same.

Reference being had to the accompanying drawings, A represents the upper part of the stove, which is furnished with a firing-door, B, and rests upon the lower part, C, having a grate, D, and poker-opening E, and furnished with an ash-pan, F, said part C and ash-pan F being supported upon a bottom, G, having feet H. The kettle I has a vertical flue, K, constructed in two parts, which are bolted together at L. The kettle is furnished with a flange, M, for supporting it upon the upper part, A, of the stove, and with a covering or lid, constructed in two parts, N and O, the part N pivoted on the flue K and the part O pivoted on the part N, which has a recess for the handle P of the mixing-arms Q, which lever and mixing-arms are pivoted on the flue K.

As the construction of the several parts hereinbefore described will be readily understood by reference to the accompanying drawings, I will proceed to describe the operation.

The stove being designed principally for cooking food for stock, the food is placed in the kettle I and fire started in the stove, as shown in Fig. 3. The heat surrounds the kettle and passes up through the flue K. The operator, by giving the lever a sweep equal to a quarter of a circle, stirs the entire contents of the kettle at a single sweep, the stirrer having four arms, Q, which are equally spaced in the kettle and of the form shown in Fig. 3, and their lower ends are constructed so as to sweep over the bottom of the kettle and thoroughly stir the mass around the flue K at its junction with the bottom of the kettle. The lid or covering is so arranged that the part O may be turned around over the part N for the purpose of charging and examining the contents of the kettle. By pulling on the lever P the parts N and O may be turned to any point desired over the kettle I—that is to say, said parts may be swung around on the upper edge of the kettle, so as to have the lever at any point radiating from the flue.

The advantage of constructing a farm-stove as hereinbefore described consists in its compactness, the utilization of the heat of the stove, the convenience for stirring the contents of the kettle, and the ease and facility for manipulating the covering of the kettle.

I am aware that it is common to have a flue in water boilers or kettles connected with cooking-stoves and in vessels used in the distilling processes. Therefore I do not claim broadly a boiler or kettle having a vertical flue in the center thereof; but What I do claim is—

In a farm-stove, the combination of a stove and a kettle having a vertical flue with a lid constructed in two parts and pivoted on said flue, and a stirring apparatus also pivoted to said flue, all constructed, arranged, and operating substantially as herein described, and for the purpose set forth.

JAMES J. JOHNSTON.

Witnesses:
A. C. JOHNSTON,
T. D. D. OURAND.